United States Patent [19]

Nuss

[11] 4,159,207

[45] Jun. 26, 1979

[54] PIGMENT

[75] Inventor: James W. Nuss, Rocky River, Ohio

[73] Assignee: Ferro Corporation, Cleveland, Ohio

[21] Appl. No.: 883,636

[22] Filed: Mar. 6, 1978

[51] Int. Cl.$^2$ .................. C04B 31/02; C08K 3/30; C08K 3/22

[52] U.S. Cl. ........................... 106/293; 106/296

[58] Field of Search .......................... 106/293, 296

[56] References Cited

U.S. PATENT DOCUMENTS

| | | | |
|---|---|---|---|
| 2,166,230 | 7/1939 | Booge et al. | 106/293 |
| 2,579,020 | 12/1951 | Smith | 106/296 |
| 3,462,389 | 8/1969 | Schulde et al. | 106/296 |
| 4,086,123 | 4/1978 | Hammel et al. | 106/293 |

Primary Examiner—O. R. Vertiz
Assistant Examiner—Mark Bell
Attorney, Agent, or Firm—Wilson, Fraser & Clemens

[57] ABSTRACT

A double phase pigment is disclosed including a first phase of a lattice of zinc sulfide, and a second phase of a lattice of zinc oxide serving as a host for manganese oxide in solid solution. The pigment may be prepared by reacting zinc oxide and manganese sulfide in an inert atmosphere at elevated temperatures.

12 Claims, No Drawings

PIGMENT

BACKGROUND OF THE INVENTION

Pigments are widely used in many industries to impart basically a pleasing, esthetic color and appearance to various media in which they are mixed, such as paints, varnishes, lacquers, organic resins, glazes, ceramic ware such as porcelain enamels, glass, and the like. As a general rule, inorganic pigments have a greater scope of application as compared to organic pigments. Because of the more severe and drastic conditions of use in glazes and ceramic applications, particularly with reference to temperature of preparation, inorganic pigments must be used for such applications. However, inorganic pigments may also be added to organic media, such as organic resinous polymeric materials, especially when such materials are used at relatively high temperatures such as in extruding or molding.

Important inorganic red pigments include those of the cadmium sulfide-cadmium selenide series. Two additionally important inorganic yellow pigments are based on cadmium sulfide and lead antimonate (Naples Yellow). As awareness of the need for environmental protection grows, industrial use of toxic and semi-toxic chemicals has come under greater scrutiny and criticism. The use of such metals as cadmium, selenium, lead and antimony, previously extensively employed in preparing pigments, has accordingly become less popular. Stronger governmental regulation and control of their use are expected. It is, therefore, important to develop substitute pigments.

SUMMARY OF THE INVENTION

It has been found that colorful pigments can be prepared, free of metals like cadmium, selenium, lead and antimony, by forming a double phase pigment, that is, a pigment which under examination by x-ray diffraction shows the presence of two distinct phases. One phase is that of the zinc sulfide lattice; and the other phase is that of the zinc oxide lattice which serves as a host for varying amounts of manganese oxide as a dopant in solid solution.

In general, the first phase is present in an amount of about one mole percent to about 20 mole percent, and the second phase is present in an amount of about 80 mole percent to about 99 mole percent, such percentages being based on the molar composition of the double phase pigment. Within the second phase, the amount of manganese oxide present with respect to the zinc oxide varies from that minute amount sufficient to vary or alter the color of the zinc oxide up to the maximum limit of solubility of manganese oxide in zinc oxide. As a rule, the manganese oxide may be present in the second phase in an amount of about one mole percent to about 15 mole percent based on the molar composition of the double phase pigment.

The pigment may be prepared by reacting zinc oxide and manganese sulfide to yield zinc oxide, manganese oxide, and zinc sulfide. The reaction is carried out in an inert atmosphere at elevated temperatures, for example, within a temperature range of about 750° C. to about 1200° C. for about 30 minutes to about 60 minutes.

DESCRIPTION OF THE PREFERRED EMBODIMENTS

In general, the present pigments are ternary and range in color from yellow to orange to red, although color is not intended as a limitation of the pigment. It is in this color range where non-toxic pigments are desired to replace pigments regarded as toxic, such as lead chromates, benzidene yellows, and cadmium yellows, oranges, and reds.

As established by x-ray diffraction, a pigment of the invention is a double phase pigment including a first phase of zinc sulfide and a second phase of zinc oxide as a host for manganese oxide in solid solution. While relative amounts are not critical, the first phase is present in relatively a minor amount, and the second phase is present in a major amount.

It is important to use manganese in the form in which it has a valance of two. The amount of the dopant, manganese oxide, in the solid solution defining the second phase may vary widely, since it is, in fact, a solution. Such amounts may range from a very small addition capable of only slightly altering the color of the host lattice of zinc oxide up to the maximum limit of solubility of manganese oxide in zinc oxide. Indeed, it is possible to exceed even this amount which results in a pigment having more than two phases. However, exceeding the double phase results in pigments of poorer color. A green hue is introduced which is thought to be due to the presence of zinc manganite. The formation of more than a double phase pigment usually tends to reduce the brilliance of the color of the pigment and impart a muddy, rather washed-out hue.

In a desired compositional class of pigments, the first phase of zinc sulfide is present in an amount of about one mole percent to about 20 mole percent, and the second phase of manganese oxide dissolved in zinc oxide is present in an amount of about 80 mole percent to about 99 mole percent. Preferably, the first phase is present from about one to 15 mole percent, and the second phase is present from about 85 to 99 mole percent.

While the amount of dopant, manganese oxide, may vary widely in the second phase as indicated, a preferred compositional class of pigments, based on the molar composition of the double phase pigment, comprises a first phase of zinc sulfide in an amount of about 1 mole percent to about 20 mole percent, and a second phase of zinc oxide of about 65 mole percent to about 98 mole percent and manganese oxide in solid solution in the zinc oxide in an amount of about one mole percent to about 15 mole percent. Preferably, zinc sulfide is present from about one to about 15 mole percent, zinc oxide is present from about 70 to about 98 mole percent, and manganese oxide is present from about one to about 15 mole percent.

The pigments may be regarded as being formed by the following reaction:

$$8ZnO + MnS = 7ZnO + MnO + ZnS$$

However, mole ratios among the reactants may vary to realize as products of the reaction double phase pigments of differing compositions such as those falling within the mole ratios previously given for the double phase pigments. In such cases, stoichiometric excesses of zinc oxide or manganese sulfide are present as reactants as may be desired. As one example, one mole of zinc oxide may be reacted with about 0.02 mole to about 0.20 mole of manganese sulfide. The second phase is a solid solution where the components need not necessarily be present in any fixed chemical or stoichiometric proportions.

Varying the ratio of the reactants causes changes in color of the resulting pigments. It is believed that the amount of manganese oxide entering the zinc oxide lattice generates the distinguishing color. For example, when the mole ratio of maganese oxide to zinc oxide in the pigment ranges from about 0.16 to about 0.20, the resulting pigment is basically red. When the mole ratio of maganese oxide to zinc oxide ranges from about 0.10 to about 0.15 the resulting pigment is basically dark orange. When the mole ratio of manganese oxide to zinc oxide ranges from about 0.04 to about 0.09, the resulting pigment is bright orange. When the mole ratio of manganese oxide to zinc oxide ranges from about 0.01 to about 0.03, the resulting pigment is bright orange-yellow.

The reaction is carried out at elevated temperatures and in an inert atmosphere. For example, the reaction may proceed within a temperature range of about 750° C. to about 1200° C. for about 30 minutes to about 60 minutes. In order to minimize oxidation of manganese oxide to manganese dioxide, as well as to minimize air oxidation of zinc sulfide, the reaction is preferably conducted in an inert atmosphere, such as an evacuated reaction vessel or a vessel having an inert gas under the circumstances such as hydrogen, argon, helium, and the like. The reaction vessel preferably is fabricated from high temperature resistant, chemically inactive materials, such as quartz, boron, nitride coated graphite, or the like. This procedure also prevents the introduction of large amounts of unwanted metal oxides.

The heating preferably is carried out by slowly rising temperature to an equilibrium temperature and for a time at the equilibrium temperature to achieve the reaction and solid solution sought, and preferably until there is no more reaction or solution taking place. For example, the reactants may be heated from about 200° C. to a temperature within the range of about 750° C. to about 1200° C. at a rate of increase of about 100° C. per hour, although these values are not critical, and then maintained or thermally soaked at the temperature reached until reaction is complete. During the reaction, zinc sulfide forms and manganese oxide is generated in situ and enters the zinc oxide lattice.

The zinc sulfide lattice constants remain substantially the same and conform with literature values for such lattice constants, regardless of the amount of components present. But the zinc oxide lattice constants change and expand isotropically as more and more manganese oxide enters the zinc oxide lattice in solid solution.

The following examples are intended only to illustrate the invention and should not be construed as imposing limitations on the claims. Percentages are by mole percent unless otherwise indicated.

EXAMPLE 1

The following is the best mode of preparing pigments of the present invention as presently known. To one liter of water at 50° C., 175.85 grams of hydrated zinc sulfate (0.98 mole) was added and allowed to dissolve. To this was added with rapid stirring 200 ml. of a solution containing 76 grams (1.90 moles) of dissolved sodium hydroxide. Zinc hydroxide precipitated. To the solution of precipitated zinc hydroxide and the remaining zinc ions, 10 ml. of a 2.0 molar (0.02 mole) of an aqueous manganese sulfate solution was added, and then, with stirring, 100 ml. of an aqueous solution containing 6.4 grams of sodium sulfide (0.05 mole). Stirring was continued for an additional five minutes.

The precipitate was filtered and washed with water until a negative sulfate test was obtained to insure that all sulfate was washed out. The raw cake was dried at 100° C. and then fired for 30 minutes in a covered porcelain crucible between about 750° C. and 1200° C. After cooling, an orange-yellow pigment was obtained which was successfully placed in an alkyd resin paint and used.

EXAMPLE 2

Pigments were also prepared by a modified process similar to that of Example 1, except that the zinc oxide was used in place of zinc sulfate. In particular, zinc oxide was placed in water to which a water-soluble maganese salt was added to furnish the bivalent manganese ion, such as manganese sulfate or manganese nitrate. A water-soluble sulfide was then added, such as sodium sulfide or ammonium sulfide, to precipitate manganese sulfide. The solution was then filtered to produce a raw cake of zinc oxide and manganese sulfide. The cake was dried at 100° C. and then fired for about 30 minutes in a covered porcelain crucible at a temperature within the range of about 750° C. to about 1200° C.

EXAMPLES 3 THROUGH 16

In these examples, blends of zinc oxide, zinc sulfide, and manganese sulfide as reactants, as shown in the following Table A, were prepared and heat-treated at about 800° C. for 20 to 30 minutes in a molten salt bath as a still further method of preparation. The bath consisted of a lithium chloride-potassium chloride eutectic composition. The ratio of salt to pigment was approximately 3:1. Reaction vessels were quartz or a boron nitride coated graphite.

Table A summarizes the results and color values obtained when the pigments of these examples were mixed with liquid polystyrene and extruded as colored plastic chips on which tristimulus values were determined in a known manner. The letter "M" means masstone in which the chip contained one part pigment per 100 parts by weight of polystyrene; the letter "T" means tint in which the chip contained 0.5 part pigment, 0.5 part $2.0_2$ per 100 parts of polystyrene. The Hunter color values, $L_1$, a and b are those conventionally calculated from the tristimulus values, where L is a measure of the reflectance, a is a measure of the redness-greenness, and b is a measure of the yellowness-blueness. The values of a and b were always positive. U.S. Pat. No. 3,849,152 to Mimeault contains a more detailed description of these values. The colors of Table A range from orange yellow to a deep brick red reminiscent of alpha ferric oxide.

TABLE A

| Example | Masstone or Tint | Reactants Mole Composition | | | Color Values | | | Color Appearance |
|---|---|---|---|---|---|---|---|---|
| | | ZnO | ZnS | MnS | L | a | b | |
| 3 | M | 0.78 | 0.02 | 0.20 | 30.1 | 37.1 | 17.4 | Tomato red |
| 4 | T | 0.78 | 0.02 | 0.20 | 62.4 | 21.4 | 16.4 | Dark pink |
| 5 | M | 0.70 | 0.15 | 0.15 | 36.5 | 38.5 | 21.8 | Burnt orange |
| 6 | T | 0.70 | 0.15 | 0.15 | 66.6 | 19.0 | 20.0 | Orange |
| 7 | M | 0.88 | 0.03 | 0.09 | 41.8 | 36.5 | 24.7 | Bright orange |
| 8 | T | 0.88 | 0.03 | 0.09 | 69.7 | 16.5 | 25.0 | Orange |
| 9 | M | 0.85 | 0.05 | 0.10 | 40.0 | 36.6 | 24.7 | Bright orange |
| 10 | T | 0.85 | 0.05 | 0.10 | 69.0 | 16.9 | 24.7 | Orange |
| 11 | M | 0.85 | 0.07 | 0.08 | 43.7 | 36.6 | 27.6 | Bright orange |
| 12 | T | 0.85 | 0.07 | 0.08 | 70.2 | 15.7 | 26.8 | Orange |
| 13 | M | 0.90 | 0.05 | 0.05 | 51.0 | 30.8 | 31.6 | Bright yellow orange |
| 14 | T | 0.90 | 0.05 | 0.05 | 74.9 | 11.0 | 28.8 | Yellow orange |
| 15 | M | 0.70 | 0.25 | 0.05 | 50.9 | 27.7 | 30.8 | Yellow orange |
| 16 | T | 0.70 | 0.25 | 0.05 | 75.8 | 9.5 | 26.3 | Pale yellow orange |

The pigments are used in a conventional manner to color plastics, resins, paints, varnishes, lacquers, and the like. It will be understood that it is not always possible to work with absolutely pure materials, such that impurities may be found in the present pigments. Such impurities can be tolerated in relatively small amounts, for example, up to about 3 mole percent and normally comprise oxides such as alumina, magnesia, silicon dioxide, and the like.

Although the foregoing describes several embodiments of the present invention, it is understood that the invention may be practiced in still other forms within the scope of the following claims.

I claim:

1. A double phase pigment consisting essentially of a first phase of zinc sulfide present in minor amount, and a second phase of zinc oxide present in major amount, said second phase serving as a host lattice and containing manganese oxide in solid solution in an amount ranging from that sufficient to change the color of zinc oxide up to the limit of solubility of manganese oxide in zinc oxide.

2. A double phase pigment of claim 1 in which said first phase is present in an amount of about one mole percent to about 20 mole percent and said second phase is present in an amount of about 80 mole percent to about 99 mole percent.

3. A double phase pigment of claim 1 in which said first phase is present in an amount of about one mole percent to about 15 mole percent, and said second phase is present in an amount of about 85 mole percent to about 99 mole percent, and said manganese oxide is present in said second phase from an amount sufficient to change the color of zinc oxide to the limit of solubility of manganese oxide in zinc oxide.

4. A double phase pigment comprising a first phase consisting essentially of about one mole percent to about 20 mole percent zinc sulfide, and a second phase comprising a solid solution consisting essentially of from about 65 mole percent to about 98 mole percent of zinc oxide as a host lattice, and from about one mole percent to about 15 mole percent of manganese oxide as a dopant in said lattice, said percentages being based on the molar composition of said double phase pigment.

5. A double phase pigment comprising a first phase consisting essentially of about one mole percent to about 15 mole percent of zinc sulfide, and a second phase comprising a solid solution consisting essentially of from about 70 mole percent to about 98 mole percent of zinc oxide as a host lattice, and from about one mole percent to about 15 mole percent of manganese oxide as a dopant in said lattice, said percentages being based on the molar composition of said double phase pigment.

6. A process for forming a double phase pigment comprising heating in inert atmosphere at an equilibrium temperature zinc oxide and manganese sulfide to yield zinc oxide, manganese oxide, and zinc sulfide, forming a first phase in minor amount of a zinc sulfide lattice from said zinc sulfide, and forming a second phase in major amount by dissolving said manganese oxide in a lattice formed by said zinc oxide, the size of said zinc sulfide lattice remaining substantially constant, and the size of said zinc oxide lattice expanding isotropically to accommodate additions of said manganese oxide.

7. The process of claim 6 in which said zinc oxide and said manganese sulfide are reacted in a molar ratio of from about 1:0.02 to about 1:0.20, respectively.

8. The process of claim 6 in which said reaction is carried out in inert atmosphere within the temperature range of about 750° C. to about 1200° C. for about 30 minutes to about 60 minutes.

9. The process of claim 6 in which the mole ratio of manganese oxide to zinc oxide in said pigment is from about 0.16 to about 0.20, and said double phase pigment is red.

10. The process of claim 6 in which the mole ratio of manganese oxide to zinc oxide in said pigment is from about 0.10 to about 0.15, and said double phase pigment is dark orange.

11. The process of claim 6 in which the mole ratio of manganese oxide to zinc oxide in said pigment is from about 0.04 to about 0.09, and said double phase pigment is bright orange.

12. The process of claim 6 in which the mole ratio of manganese oxide to zinc oxide in said pigment is from about 0.01 to about 0.03, and said double phase pigment is bright orange-yellow.

* * * * *